(12) United States Patent
Fujiwara

(10) Patent No.: US 9,103,363 B2
(45) Date of Patent: Aug. 11, 2015

(54) TWO-PIECE CLIP ASSEMBLY

(75) Inventor: Kensuke Fujiwara, Toyota (JP)

(73) Assignee: NIFCO INC., Yokohama-shi, Kanagawa (JP)

( * ) Notice: Subject to any disclaimer, the term of this patent is extended or adjusted under 35 U.S.C. 154(b) by 109 days.

(21) Appl. No.: 13/997,502

(22) PCT Filed: Dec. 20, 2011

(86) PCT No.: PCT/JP2011/079549
§ 371 (c)(1),
(2), (4) Date: Jun. 24, 2013

(87) PCT Pub. No.: WO2012/086652
PCT Pub. Date: Jun. 28, 2012

(65) Prior Publication Data
US 2013/0287517 A1    Oct. 31, 2013

(30) Foreign Application Priority Data
Dec. 24, 2010  (JP) ................. 2010-288942

(51) Int. Cl.
*F16B 13/06* (2006.01)
*F16B 19/10* (2006.01)
*F16B 5/06* (2006.01)

(52) U.S. Cl.
CPC ........... *F16B 19/1081* (2013.01); *F16B 5/0642* (2013.01)

(58) Field of Classification Search
CPC .................................... F16B 5/0642
USPC ........................ 411/45, 360; 24/297
IPC .................................... F16B 19/1081
See application file for complete search history.

(56) References Cited

U.S. PATENT DOCUMENTS

| | | | |
|---|---|---|---|
| 4,832,547 A * | 5/1989 | Shiraishi | 411/42 |
| 4,840,523 A * | 6/1989 | Oshida | 411/48 |
| 4,952,106 A | 8/1990 | Kubogochi et al. | |
| 7,736,107 B2 * | 6/2010 | Okada | 411/41 |
| 2010/0162534 A1 * | 7/2010 | Kato | 24/292 |

FOREIGN PATENT DOCUMENTS

| | | |
|---|---|---|
| JP | H02-047414 U | 3/1990 |
| JP | H07-208423 A | 8/1995 |
| JP | 2007-056895 A | 3/2007 |
| JP | 4423266 B | 12/2009 |

* cited by examiner

Primary Examiner — Gary Estremsky
(74) Attorney, Agent, or Firm — Manabu Kanesaka

(57) ABSTRACT

An engagement convex portion is formed in a grommet of a two-piece clip, and a head portion-side engagement concave portion is formed in a pin of the two-piece clip. When the pin is pushed into the grommet to a maximum push-in position, an inner end of the engagement convex portion of the grommet abuts against a middle of a tip-side concave portion wall surface of the head portion-side engagement concave portion. Thus, in the maximum push-in position, when a tip portion of the pin is pushed back in an extracting direction, the tip-side concave portion wall surface of the head portion-side engagement concave portion of the pin slides against the inner end of the engagement convex portion of the grommet.

6 Claims, 7 Drawing Sheets

TWO-PIECE CLIP ASSEMBLY

RELATED APPLICATIONS

The present application is National Phase of International Application No. PCT/JP2011/079549 filed Dec. 20, 2011, and claims priority from Japanese Application No. 2010-288942, filed Dec. 24, 2010.

FIELD OF TECHNOLOGY

The present invention relates to a two-piece clip fastening two or more members provided with attachment holes together by insertion into the attachment holes and the following fastening operation in a state wherein the attachment holes are overlapped to be communicated with each other.

BACKGROUND ART

Conventionally, as for the two-piece clip, for example, there is Patent Document 1. In the conventional technology, after a body portion of a female part is inserted and passed through the attachment holes communicated with each other, an axis portion of a male part is pushed into the body portion up to a standard position. In the standard position, by engaging with a body portion side, the body portion of the female part is elastically deformed outward, and the two members provided with the attachment holes are mutually fastened together. Also, the body portion of the female part splits into two or more body-portion configuration pieces by slits ranging from a tip thereof to a base. Also, in at least one of the body-portion configuration pieces, a tip side thereof is an extension operating portion. Consequently, by operating the extension operating portion, without using an industrial tool and the like, the two-piece clip can be easily returned to a reusable position.

PRIOR ART DOCUMENT

Patent Document

Patent Document 1: Japanese Patent No. 4423266

DISCLOSURE OF THE INVENTION

Problems to be Solved by the Invention

The present invention is made in view of the aforementioned fact, and provides a two-piece clip which can improve a workability at a time of returning to the reusable position.

Means for Solving the Problems

The first aspect of the present invention provides a two-piece clip comprising a grommet including a body portion split by two or more slits ranging from a tip to a base, forming an engagement convex portion in a tip portion, and inserted into attachment holes of overlapped members, and a base portion provided in a base portion of the body portion, and abutting against a peripheral edge portion of the attachment holes of the aforementioned members; a pin including an axis portion which can be pushed into the body portion of the grommet, and a head portion provided in one end portion of the axis portion; a tip-side engagement concave portion formed in the axis portion of the pin, engaged with the engagement convex portion of the grommet in a standard position wherein the pin is pushed into the grommet with a predetermined amount, elastically deforming the body portion of the grommet outward, and clamping the aforementioned members by the body portion and the base portion; and a head portion-side engagement concave portion formed in the head portion side more than the tip-side engagement concave portion in the axis portion of the pin, engaged with the engagement convex portion of the body portion in a maximum push-in position wherein the pin is pushed into the grommet further than the standard position, and elastically returning the body portion of the grommet inward to allow the body portion of the grommet to pass through the attachment holes. The engagement convex portion of the grommet includes a tip-side convex portion wall surface inclining in an inner direction of the body portion from a tip side of the body portion; and a base portion-side convex portion wall surface inclining in the inner direction of the body portion from a base portion side of the grommet. The head portion-side engagement concave portion of the pin includes a tip-side concave portion wall surface inclining in an inner direction of the axis portion from the tip side; and a head portion-side concave portion wall surface inclining in the inner direction of the axis portion from the head portion side of the pin. In the maximum push-in position, an inner end of the tip-side convex portion wall surface of the engagement convex portion abuts against a middle of the tip-side concave portion wall surface of the head portion-side engagement concave portion.

In the aforementioned aspect, after the body portion of the grommet is entered into the communicated attachment holes of the overlapped members, the axis portion of the pin is pushed into the body portion up to the standard position, so that the engagement convex portion of the grommet engages with the tip-side engagement concave portion of the pin, and the body portion of the grommet elastically deforms outward. Accordingly, two or more members can be clamped between the body portion and the base portion. Also, by further pushing the axis portion of the pin which is in the standard position up to the maximum push-in position using the head portion thereof, the engagement convex portion of the grommet engages with the head portion-side engagement concave portion of the pin, and the body portion of the grommet bended outward in the standard position elastically returns so as to be capable of resolving the fastening of the body portion of the grommet to the attachment holes. Thereby, the two-piece clip can be extracted and removed from the attachment holes. Moreover, when the tip portion of the pin is pushed back in an extracting direction, since the inner end of the tip-side convex portion wall surface of the engagement convex portion of the grommet abuts against the middle of the tip-side concave portion wall surface of the head portion-side engagement concave portion in the pin, the tip-side concave portion wall surface of the head portion-side engagement concave portion in the pin slides against the inner end of the tip-side convex portion wall surface of the engagement convex portion of the grommet. As a result, the body portion of the grommet can be easily elastically deformed outward. Namely, the tip-side concave portion wall surface of the head portion-side engagement concave portion in the pin slides against an inner end of the engagement convex portion of the grommet by a force pushing the tip portion of the pin back in the extracting direction so as to be capable of spreading the body portion of the grommet. Consequently, this is a simple operation of pushing the tip portion of the pin back in the extracting direction, and an operational force can be reduced as well. As a result, a workability when the pin is returned to a reusable position relative to the grommet is improved.

As for a second aspect of the present invention, in the first aspect of the present invention, an inner peripheral portion of the body portion of the grommet and an outer peripheral portion of the axis portion of the pin may contact with each other on a surface extending in a direction along an axis line of the pin.

In the aforementioned aspect, the inner peripheral portion of the body portion of the grommet and the outer peripheral portion of the axis portion of the pin contact with each other on the surface extending in the direction along the axis line of the pin, so that the inner peripheral portion of the body portion of the grommet and the outer peripheral portion of the axis portion of the pin are closely attached on the surface extending in the direction along the axis line of the pin. Consequently, a contact area of the inner peripheral portion of the body portion of the grommet relative to the outer peripheral portion of the axis portion of the pin increase. As a result, in a state wherein two or more members are fastened together so as not to be separated, the pin becomes hard to be extracted relative to the grommet so as to improve a removal resistance.

As for a third aspect of the present invention, in the first or second aspect of the present invention, an inclination angle relative to the axis line of the pin of the head portion-side concave portion wall surface in the head portion-side engagement concave portion formed in the pin may have a wide angle compared to an inclination angle relative to the axis line of the pin of the tip-side concave portion wall surface in the head portion-side engagement concave portion formed in the pin.

In the aforementioned aspect, since the inclination angle relative to the axis line of the pin of the head portion-side concave portion wall surface in the head portion-side engagement concave portion formed in the pin has the wide angle compared to the inclination angle relative to the axis line of the pin of the tip-side concave portion wall surface in the head portion-side engagement concave portion formed in the pin, a closely attached portion of the inner peripheral portion of the body portion of the grommet and the outer peripheral portion of the axis portion of the pin can be extended long toward a tip side of the pin. Consequently, the contact area of the inner peripheral portion of the body portion of the grommet relative to the outer peripheral portion of the axis portion of the pin increases. As a result, in the state wherein the two or more members are fastened together so as not to be separated, the pin becomes hard to be extracted relative to the grommet so as to improve the removal resistance.

As for a fourth aspect of the present invention, in any of the first to third aspects of the present invention, the inclination angle relative to the axis line of the pin of the tip-side concave portion wall surface in the head portion-side engagement concave portion formed in the pin may have a narrow angle compared to an inclination angle relative to the axis line of the pin of the tip-side convex portion wall surface in the engagement convex portion formed in the grommet.

In the aforementioned aspect, since the inclination angle relative to the axis line of the pin of the tip-side concave portion wall surface of the head portion-side engagement concave portion formed in the pin has the narrow angle compared to the inclination angle relative to the axis line of the pin of the tip-side convex portion wall surface of the engagement convex portion formed in the grommet, there can be created a gap between the pin and the grommet. Consequently, a contact portion of the pin and the grommet is reduced, so that a force applied to a tip of the pin concentrates on the contact portion of the pin and the grommet so as to be easily transmitted to a grommet side. As a result, the workability at a time of returning to the reusable position further improves.

As for a fifth aspect of the present invention, in any of the first to fourth aspects of the present invention, in the inner end of the engagement convex portion of the grommet, there may be formed a convex portion having a curved shape.

In the aforementioned aspect, since the convex portion having the curved shape is formed in the inner end of the engagement convex portion of the grommet, the body portion of the grommet elastically deforms outward, and when the tip-side concave portion wall surface of the head portion-side engagement concave portion in the pin slides against the inner end of the engagement convex portion of the grommet, the pin can easily slide against the grommet. As a result, the workability at the time of returning to the reusable position further is improved.

Effect of the Invention

The first aspect of the present invention has the aforementioned configuration so as to be capable of improving the workability at the time of returning to the reusable position.

The second aspect of the present invention has the aforementioned configuration so as to be capable of improving the removal resistance.

The third aspect of the present invention has the aforementioned configuration so as to be capable of improving the removal resistance.

The fourth aspect of the present invention has the aforementioned configuration so as to be capable of further improving the workability at the time of returning to the reusable position.

The fifth aspect of the present invention has the aforementioned configuration so as to be capable of further improving the workability at the time of returning to the reusable position.

BEST MODES OF CARRYING OUT THE INVENTION

Next, one embodiment of a two-piece clip of the present invention will be explained according to FIGS. 1 to 8. Incidentally, in the figures, an arrow PUS indicates an insertion direction of the two-piece clip into an attachment hole, and an insertion direction of a pin into a grommet.

(Configuration of Two-Piece Clip)

Next, a configuration of a two-piece clip 10 of the present embodiment will be explained.

Figure 8:
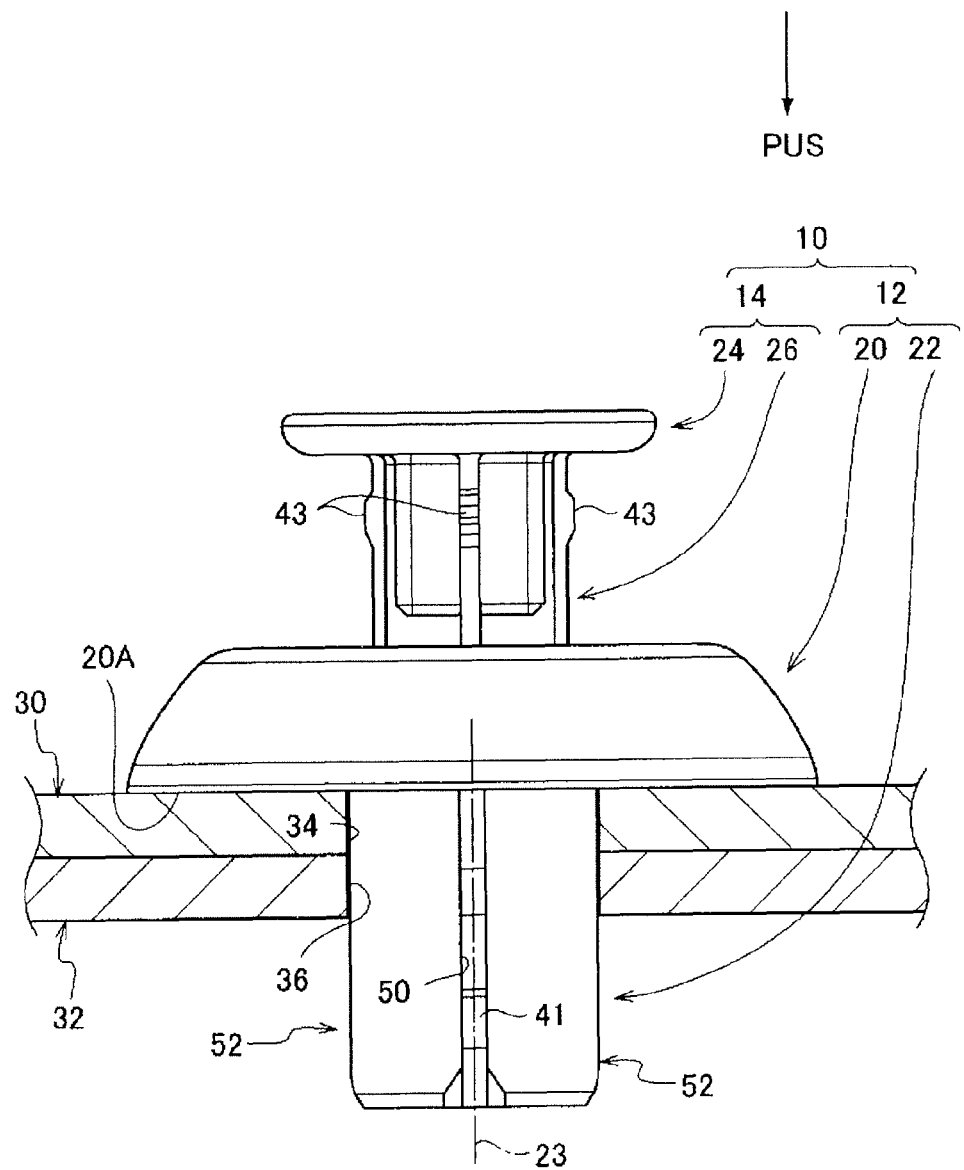
FIG. 8 is a side view showing the minimum push-in position in the state wherein the two-piece clip according to one embodiment of the present invention is placed in the members.

As shown in FIG. 8, the two-piece clip 10 of the present embodiment is made of synthetic resin, and comprises a grommet 12 and a pin 14. Also, the grommet 12 includes a base portion 20 and a body portion 22, and the pin 14 includes a head portion 24 and an axis portion 26.

(Configuration of Grommet)

Figure 5:
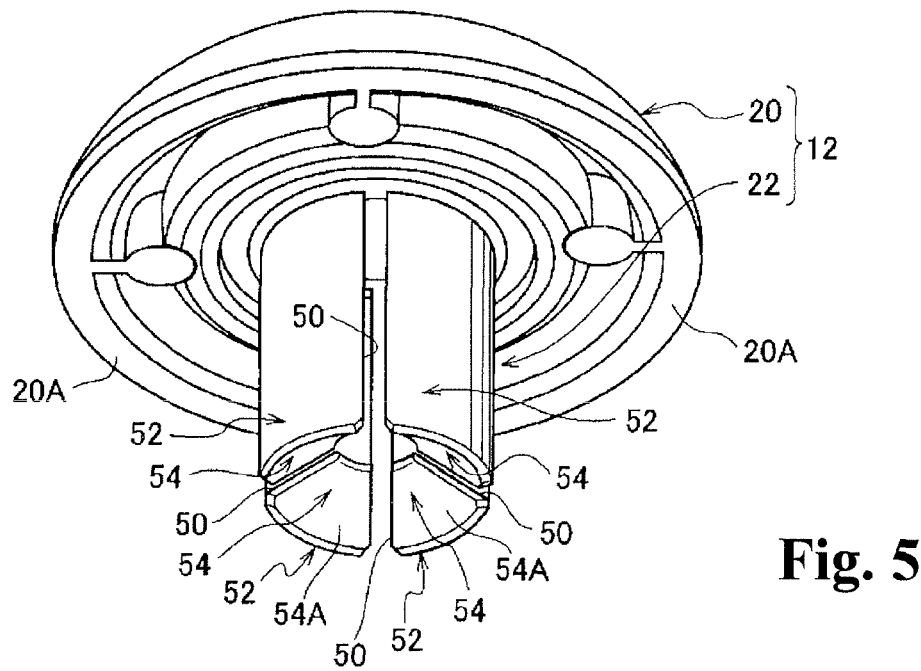
FIG. 5 is a perspective view showing a grommet of the two-piece clip according to one embodiment of the present invention, and viewed from a body portion side.
Figure 6:
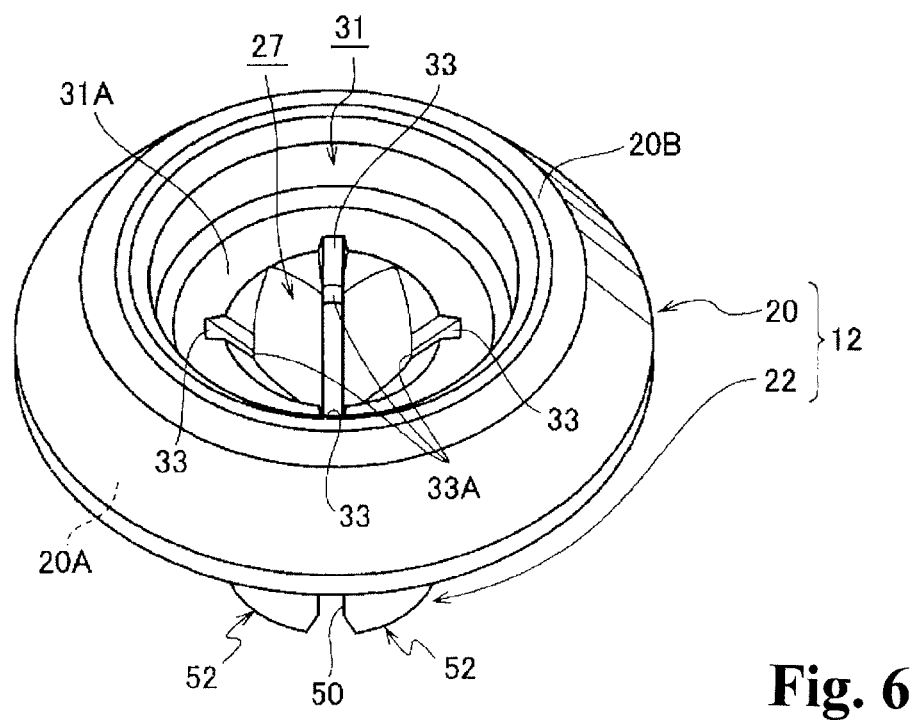
FIG. 6 is a perspective view showing the grommet of the two-piece clip according to one embodiment of the present invention, and viewed from a base portion side.

As shown in FIG. 5 and FIG. 6, the base portion 20 of the grommet 12 has a disk shape. Incidentally, as shown in FIG. 8, the base portion 20 of the grommet 12 has a size preventing the base portion 20 of the grommet 12 from entering into attachment holes 34 and 36 of two or more members 30 and 32 fastened together by the two-piece clip 10. Also, a back face 20A, which is a face on a protruding side of the body portion 22 in the base portion 20 of the grommet 12, is a face orthogonal to a center axis 23 of the body portion 22.

Figure 2:
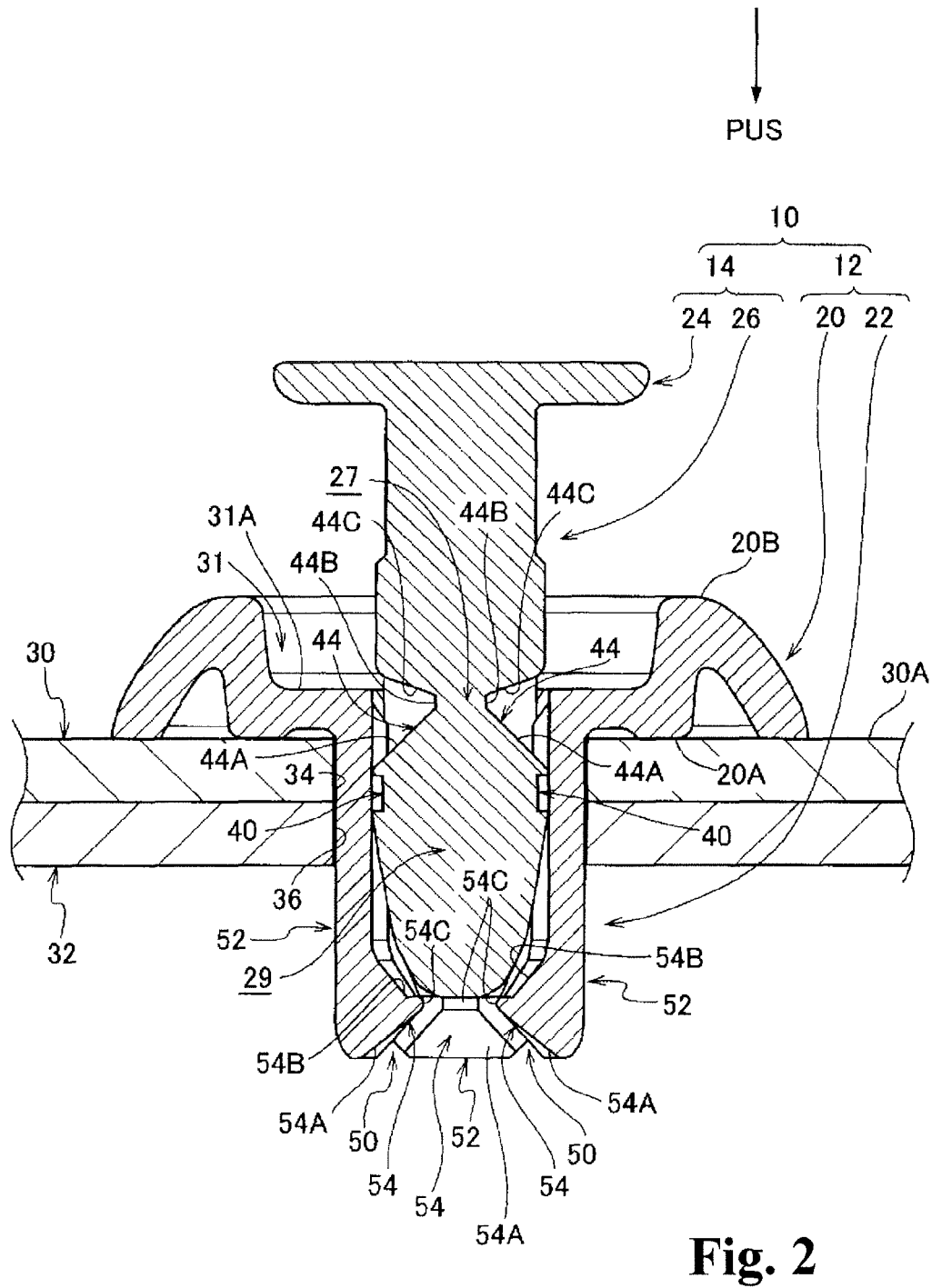
FIG. 2 is a side cross-sectional view showing a minimum push-in position in a state wherein the two-piece clip according to one embodiment of the present invention is placed in members.

As shown in FIG. 2, the body portion 22 of the grommet 12 can be inserted and passed through the attachment holes 34 and 36 of the members 30 and 32 up to a position wherein the back face 20A of the base portion 20 abuts against an external surface 30A of the member 30 which is located on a side just in front of an insertion. Also, in a central portion of the base portion 20 of the grommet 12, there is provided an insertion hole 27 in a passing-through state, and in the insertion hole 27, there is inserted the axis portion 26 of the pin 14. Also, the insertion hole 27 is formed in a bottom 31A of a concave portion 31 having a circular inner outline shape formed in the center of the base portion 20 of the grommet 12.

The insertion hole 27 has a size preventing the head portion 24 of the pin 14 from entering in, and the insertion hole 27 is communicated with a space 29 inside the body portion 22 of the grommet 12. Also, the concave portion 31 has a size allowing the head portion 24 of the pin 14 to be housed, and a depth larger than a thickness of the head portion 24 of the pin 14.

Figure 3:
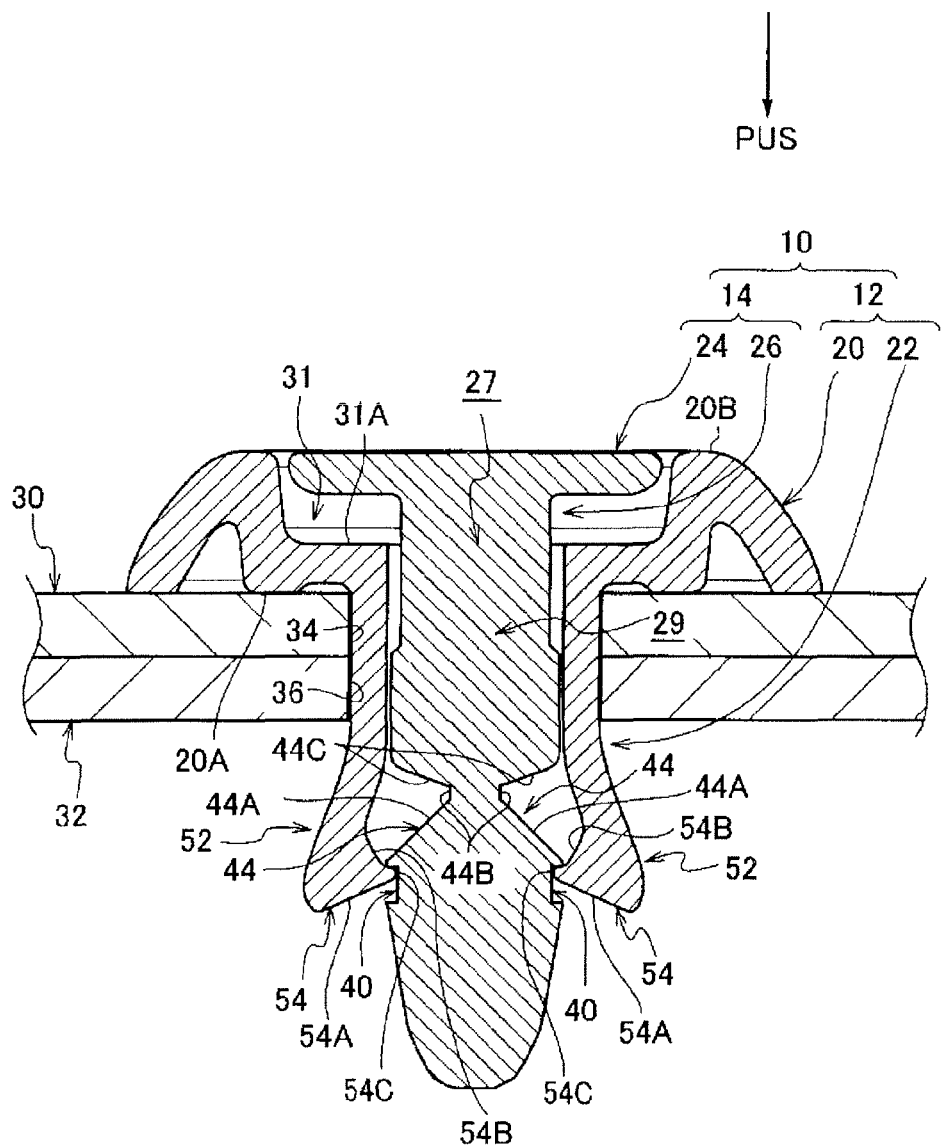
FIG. 3 is a side cross-sectional view showing a standard position in a state wherein the two-piece clip according to one embodiment of the present invention is placed in the members.

Therefore, when the pin 14 is pushed into the standard position shown in FIG. 3 from a minimum push-in position shown in FIG. 2, the head portion 24 of the pin 14 approximately comes to the same position as a top portion 20B of the base portion 20 of the grommet 12 so as not to be capable of protruding from the concave portion 31.

As shown in FIG. 5, the body portion 22 of the grommet 12 splits into two or more (four in the present embodiment) body-portion configuration pieces 52 by slits 50 ranging from a tip thereof to a base. Also, the body portion 22 has a cylindrical body whose both ends are open, and one end thereof is integrated with the hack face 20A of the base portion 20 such that a cylinder inner space is communicated with the insertion hole 27.

The slits 50 are formed ranging from one end (the tip) to the other end (the base) of the body portion 22 having the cylindrical body. The slits 50 are provided with four portions opening approximately with an equal interval between the slits 50 next to each other in a circling direction of the cylindrical body. Thereby, the body portion 22 of the grommet 12 splits into four body-portion configuration pieces 52.

As shown in FIG. 2, on a tip side of each body-portion configuration piece 52 of the grommet 12, there is formed an engagement convex portion 54. In a formation position of the engagement convex portion 54, an inside diameter of the space 29 inside the body portion 22 is made smaller than a maximum diameter of the axis portion 26 of the pin 14. Also, the inside diameter of the space 29 inside the body portion 22 from the formation position of the engagement convex portion 54 to the base portion 20 is configured to be approximately equal to the maximum diameter of the axis portion 26 of the pip 14.

The engagement convex portion 54 of the grommet 12 includes a tip-side convex portion wall surface 54A inclining in an inner direction from an outside of the body portion 22 toward a base portion 20 side from a tip side (the opposite side of the base portion 20) of the body portion 22; and a head portion-side convex portion wall surface 54B inclining in the inner direction from the outside of the body portion 22 toward the tip side from a base side (the base portion 20 side) of the body portion 22. Also, from an inner end of the engagement convex portion 54, there is formed a top-portion projection 54C (a convex portion) as the convex portion protruding inwardly (the inner direction of the body portion 22). Incidentally, a cross-sectional shape along an axis direction of the grommet 12 of the top-portion projection 54C has a curved shape (a rounded shape).

As shown in FIG. 6, in a hole edge portion of the insertion hole 27 in the base portion 20 of the grommet 12, there are formed guide concave portions 33 with four portions mutually opening approximately at an equal interval in a circling direction thereof. Also, a bottom surface of the guide concave portions 33 inclines in a direction gradually projecting to a center side of the base portion 20 toward a back surface 20A side from a Lop portion 20B side of the base portion 20. Then, the guide concave portions 33 end leaving climbing-over portions 33A with respect to a terminating end of the slit 50.

(Configuration of Pin)

Figure 7:
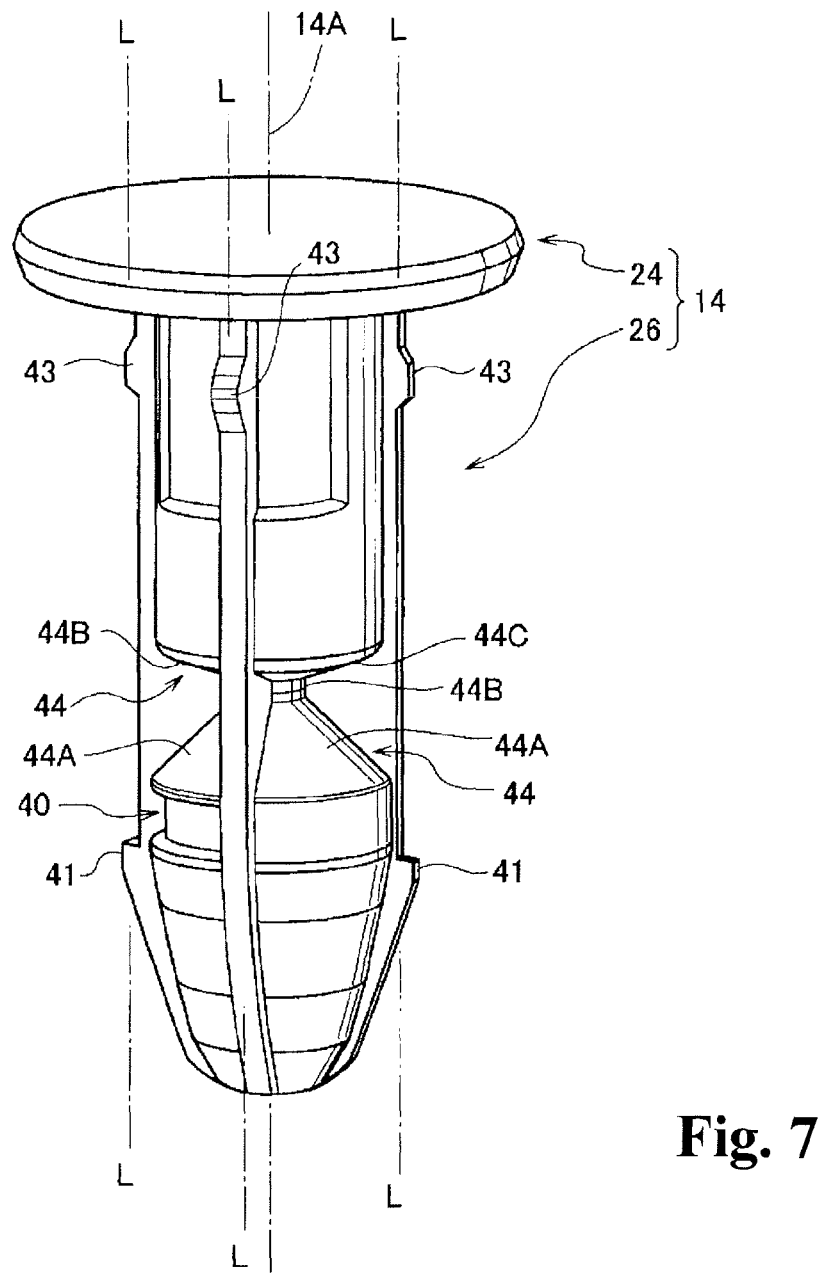
FIG. 7 is a perspective view showing a pin of the two-piece clip according to one embodiment of the present invention.

As shown in FIG. 7, the axis portion 26 of the pin 14 has a round bar-shaped body whose end narrows. Also, approximately in a middle position in a direction along an axis line 14A in the axis portion 26 of the pin 14, there is formed a head portion-side engagement concave portion 44, and on a tip side adjoining the head portion-side engagement concave portion 44, there is formed a tip-side engagement concave portion 40. Incidentally, the head portion-side engagement concave portion 44 is made deeper (larger) than the tip-side engagement concave portion 40. Although the engagement convex portion 54 of the grommet 12 cannot be completely entered into the tip-side engagement concave portion 40 of the pin 14, the engagement convex portion 54 of the grommet 12 can be completely entered into the head portion-side engagement concave portion 44. Also, in a tip side more than the tip-side engagement concave portion 40 in the axis portion 26 of the pin 14, there are formed retaining small projections 41, and near the head portion 24 in the axis portion 26 of the pin 14, there are formed head portion-side small projections 43.

Figure 4:
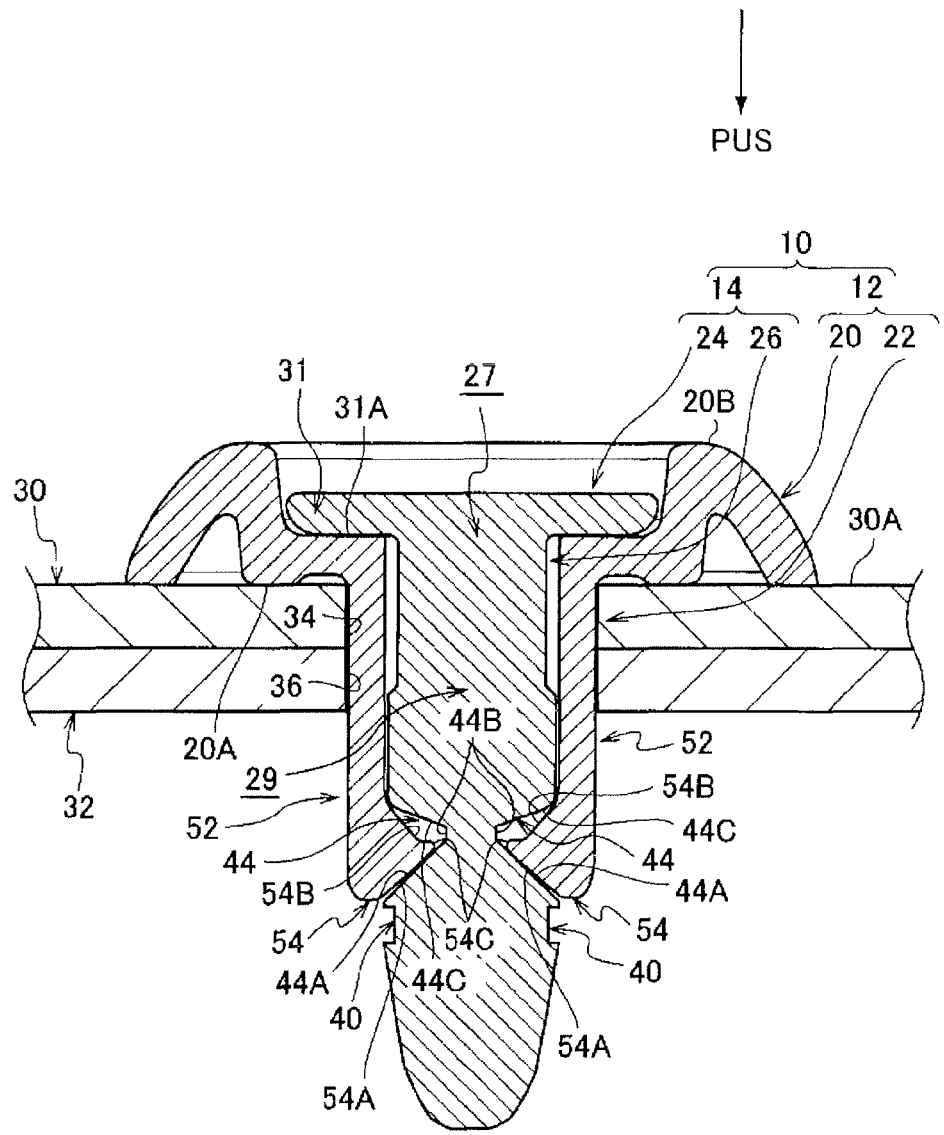
FIG. 4 a side cross-sectional view showing the maximum push-in position in the state wherein the two-piece clip according to one embodiment of the present invention is placed in the members.

As shown in FIG. 4, the head portion-side engagement concave portion 44 has a concave-portion inside shape following an outline shape of the engagement convex portion 54 of the body-portion configuration piece 52 in the grommet 12.

As shown in FIG. 7, the head portion-side engagement concave portion 44 is provided with four portions opening approximately at an equal interval between the head portion-side engagement concave portions 44 next to each other in a circling direction of the axis portion 26 of the pin 14. Also, in the head portion-side engagement concave portion 44, both a tip-side concave portion wall surface 44A, and a head portion-side concave portion wall surface 44C continuing to the tip-side concave portion wall surface 44A through a continuous axis portion 44B have an inclined surface.

On the other hand, the tip-side engagement concave portions 40 of the pin 14 are formed only in portions adjoining the two head portion-side engagement concave portions 44, which are located in an opposed position sandwiching the center of the axis portion 26. Also, the tip-side engagement concave portions 40 have a shallow rectangular depression long in the circling direction of the axis portion 26 to allow only the top-portion projection 54C of the engagement convex portion 54 to be entered therein.

Therefore, as shown in FIG. 3, when the pin 14 is pushed into the standard position, the engagement convex portion 54 of the grommet 12 enters into the tip-side engagement concave portion 40 of the pin 14, and the body portion 22 of the grommet 12, i.e., each body-portion configuration piece 52 can elastically deform outward. As a result, the members 30 and 32 are clamped between the body-portion configuration piece 52 and the base portion 20 of the grommet 12, and the members 30 and 32 can be fastened together so as not to be separated. Also, as shown in FIG. 4, when the pin 14 is pushed into the maximum push-in position, the engagement convex portion 54 of the grommet 12 enters into the head portion-side engagement concave portion 44.

Namely, the axis portion 26 of the pin 14 which is in the standard position is further pushed into the maximum push-in position using the head portion 24, so that each body-portion configuration piece 52 of the grommet 12, which has bended outward in the standard position, is elastically returned into the head portion-side engagement concave portion 44 so as to be capable of resolving the fastening of the axis portion 26 of the pin 14 into the attachment holes 34 and 36. Thereby, the two-piece clip 10 can be extracted and removed from the attachment holes 34 and 36.

Incidentally, as shown in FIG. 3, in a state wherein the axis portion 26 of the pin 14 is pushed into the grommet 12 up to the standard position, the head portion 24 of the pin 14 does not protrude from the concave portion 31 of the base portion 20 of the grommet 12, so that in the standard position, the head portion 24 of the pin 14 is not unexpectedly pushed, and the axis portion 26 is pushed in up to the maximum push-in position so as to be incapable of resolving the fastening relative to the attachment holes 34 and 36.

Figure 1:
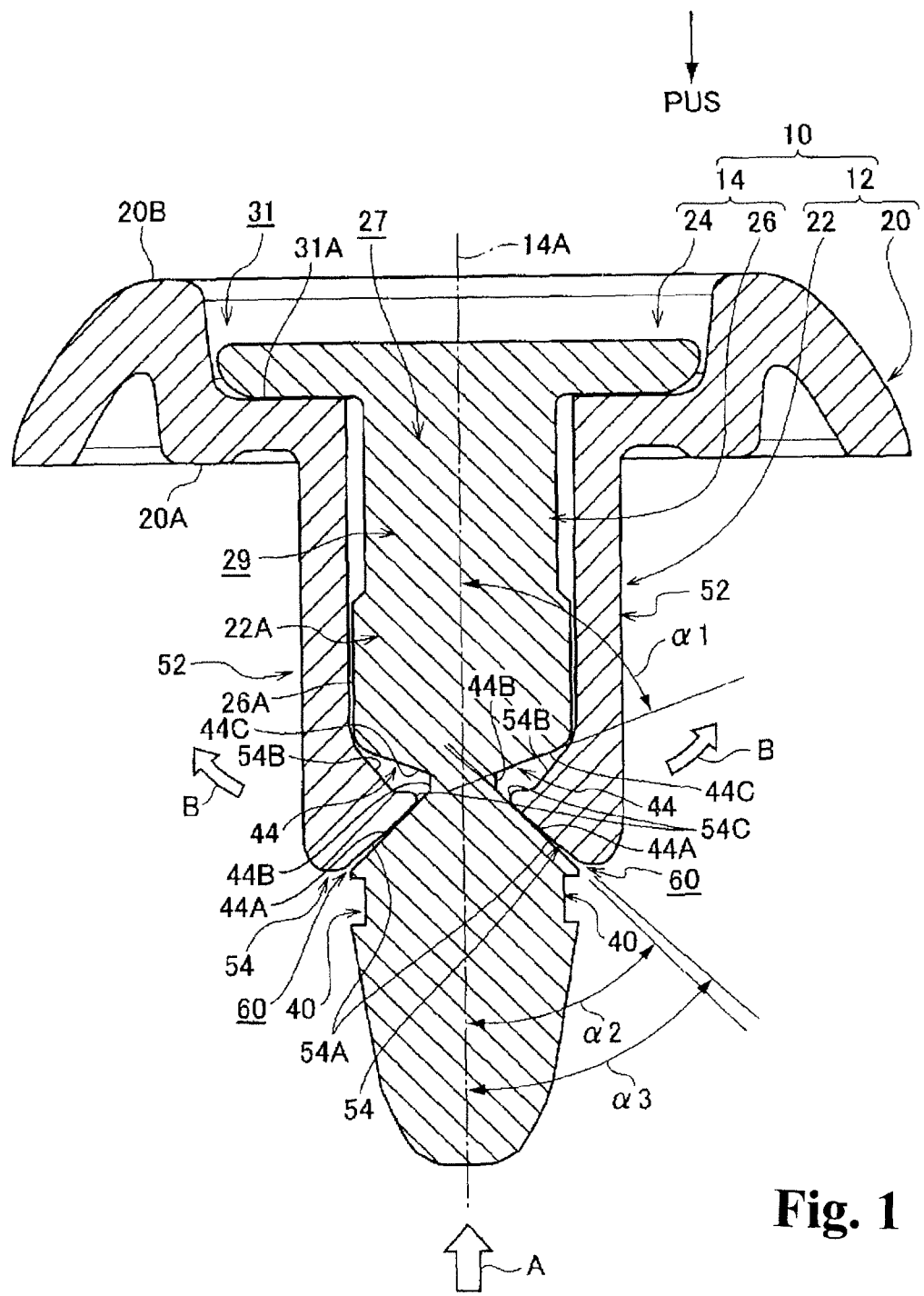
FIG. 1 is a side cross-sectional view showing a maximum push-in position of a two-piece clip according to one embodiment of the present invention.

As shown in FIG. 1, the tip-side concave portion wall surface 44A of the head portion-side engagement concave portion 44 of the pin 14 inclines in an inner direction from an outside of the axis portion 26 toward a head portion 24 side from a tip side of the pin 14. Also, the head portion-side concave portion wall surface 44C of the head portion-side engagement concave portion 44 of the pin 14 inclines in the inner direction from the outside of the axis portion 26 toward the tip side from the head portion 24 side of the pin 14. Also, in a state wherein the top-portion projection 54C of the engagement convex portion 54 of the grommet 12 has been completely entered in the head portion-side engagement concave portion 44 of the axis portion 26 of the pin 14 (the maximum push-in position), an inner end of the tip-side convex portion wall surface 54A of the engagement convex portion 54 abuts against a middle of the tip-side concave portion wall surface 44A of the head portion-side engagement concave portion 44.

Therefore, as shown in FIG. 1, in the maximum push-in position, when a tip portion of the pin 14 is pushed back in an extracting direction (an arrow A direction in FIG. 1), the tip-side concave portion wall surface 44A of the head portion-side engagement concave portion 44 of the pin 14 slides against the inner end of the tip-side convex portion wall surface 54A of the engagement convex portion 54 of the grommet 12 so as to easily elastically deform each body-portion configuration piece 52 of the grommet 12 in an outer direction (arrow B directions in FIG. 1). Namely, by a force pushing the tip portion of the pin 14 back in the extracting direction, the tip-side concave portion wall surface 44A of the head portion-side engagement concave portion 44 in the pin 14 slides against the inner end of the tip-side convex portion wall surface 54A of the engagement convex portion 54 of the grommet 12 so as to be capable of easily spreading the engagement convex portion 54 of the grommet 12 in the outer direction. Consequently, by a simple operation of pushing the tip portion of the pin 14 back in the extracting direction, and by the operation capable of reducing an operational force, the pin 14 can be returned to the minimum push-in position (a reusable position) from the maximum push-in position shown in FIG. 1 relative to the grommet 12 through the standard position.

As shown in FIG. 7, both the retaining small projections 41 and the head portion-side small projections 43 of the pin 14 are provided on imaginary straight lines L along the axis line 14A of the pin 14 passing between the head portion-side engagement concave portions 44 next to each other. Incidentally, the retaining small projections 41 are provided with two portions on both sides in a diametrical direction of the axis portion 26, and the head portion-side small projections 43 are provided with four portions.

Therefore, the guide concave portions 33 (see FIG. 6) of the grommet 12 allow the axis portion 26 of the pin 14 to enter into the body portion 22 of the grommet 12 through the insertion hole 27 of the grommet 12 only in a direction allowing the retaining small projections 41 of the pin 14 to be entered. By the inserting operation, the retaining small projections 41 elastically deform, and climb over the climbing-over portions 33A so as to be entered into the slits 50.

In the minimum push-in position (the reusable position shown in FIG. 2, the axis portion 26 does not allow the body-portion configuration pieces 52 outward, and the body portion 22 of the grommet 12 and the axis portion 26 of the pin 14 are not engaged. However, the retaining small projections 41 of the pin 14 shown in FIG. 7 are caught on the terminating end of the slit 50, so that even if the axis portion 26 is not pushed in up to the standard position, the axis portion 26 of the pin 14 cannot be completely extracted from the body portion 26 of the pin 14.

Also, when the axis portion 26 of the pin 14 is pushed in up to a complete push-in position from the standard position, the head portion-side small projections 43 of the pin 14 elastically deform, and climb over the climbing-over portions 33A of the grommet 12 so as to be entered into the slits 50. Incidentally, since a configuration of the aforementioned portion is well-known, a detailed explanation will be omitted.

As shown in FIG. 3, an inner peripheral portion 22A of the body portion 22 of the grommet 12 and an outer peripheral portion 26A of the axis portion 26 of the pin 14 contact with each other on a surface extending in the direction along the axis line 14A of the pin 14. Consequently, the inner peripheral portion 22A of the body portion 22 of the grommet 12 and the outer peripheral portion 26A of the axis portion 26 of the pin 14 are closely attached on the surface extending in the direction along the axis line 14A of the pin 14. Therefore, in a state wherein the members 30 and 32 are fastened together by the two-piece clip 10 so as not to be separated, a contact area of the inner peripheral portion 22A of the body portion 22 of the grommet 12 relative the outer peripheral portion 26A of the axis portion 26 of the pin 14 increases, so that the pin 14 becomes hard to be extracted relative to the grommet 12 so as to improve a removal resistance force.

As shown in FIG. 1, an inclination (initial rise) angle α1 relative to the axis line 14A of the pin 14 of the head portion-side concave portion wall surface 44C in the head portion-side engagement concave portion 44 formed in the pin 14 has a wide angle ($\alpha1>\alpha2$) compared to an inclination (initial rise) angle $\alpha2$ relative to the axis line 14A of the pin 14 of the tip-side concave portion wall surface 44A in the head portion-side engagement concave portion 44 formed in the pin 14. Therefore, a range, wherein the inner peripheral portion 22A of the body portion 22 of the grommet 12 and the outer peripheral portion 26A of the axis portion 26 of the pin 14 are closely attached, can be increased long toward the tip side of the pin 14. Also, the contact area of the inner peripheral portion 22A of the body portion 22 of the grommet 12 relative to the outer peripheral portion 26A of the axis portion 26 of the pin 14 increases. Consequently, in the state wherein the members 30 and 32 are fastened together by the two-piece clip 10 so as not to be separated, the pin 14 becomes hard to be extracted relative to the grommet 12 so as to improve a removal resistance.

Also, the inclination (initial rise) angle $\alpha2$ relative to the axis line 14A of the pin 14 of the tip-side concave portion wall surface 44A in the head portion-side engagement concave portion 44 formed in the pin 14 has a narrow angle ($\alpha2<\alpha3$) compared to an inclination (initial rise) angle $\alpha3$ relative to the axis line 14A of the pin 14 of the tip-side convex portion wall surface 54A in the engagement convex portion 54 formed in the grommet 12. Therefore, in a state wherein the engagement convex portion 54 of the grommet 12 abuts against the tip-side concave portion wall surface 44A of the head portion-side engagement concave portion 44, a gap 60 can be formed between the pin 14 and the grommet 12. Consequently, a contact portion of the pin 14 relative to the grommet 12 is reduced, so that a force applied to the tip of the pin 14 concentrates on the contact portion of the pin 14 and the grommet 12 so as to be easily transmitted to a grommet side.

(Attachment Procedure)

Next, an attachment procedure of the two-piece clip 10 of the present embodiment will be explained.

As shown in FIG. 2, the two-piece clip 10 which is in the minimum push-in position (the usable position), wherein a tip portion of the axis portion 26 of the pin 14 is entered into the body portion 22 of the grommet 12, is inserted into the attachment holes 34 and 36 of the members 30 and 32. At that time, the two-piece clip 10 is inserted and passed through the attachment holes 34 and 36 of the members 30 and 32 up to the position wherein the back face 20A of the base portion 20 contacts with the external surface of the member 30 which is located on the side just in front of the insertion.

Next, as shown in FIG. 3, the axis portion 26 of the pin 14 is pushed into the body portion 22 of the grommet 12 so as to enter in the standard position. Thereby, the engagement convex portion 54 of the grommet 12 is entered into the tip-side engagement concave portion 40 of the pin 14, so that the body portion 22 of the grommet 12, i.e., each body-portion configuration piece 52 elastically deforms outward. As a result, the members 30 and 32 are clamped between the body-portion configuration piece 52 and the base portion 20 of the grommet 12, and the members 30 and 32 can be fastened together so as not to be separated.

(Removal Procedure)

Next, a removal procedure of the two-piece clip 10 of the present embodiment will be explained.

As shown in FIG. 3, from the state (the standard position) wherein the members 30 and 32 are fastened together by the two-piece clip 10 of the present embodiment so as not to be separated, the head portion 24 of the pin 14 is pushed in so as to enter into the maximum push-in position shown in FIG. 4. Thereby, the body-portion configuration piece 52 of the grommet 12 elastically deforms outward once, and an engagement between the tip-side engagement concave portion 40 of the axis portion 26 of the pin 14 and the engagement convex portion 54 of the grommet 12 is released. After that, the body-portion configuration piece 52 of the grommet 12 is elastically returned, and the engagement convex portion 54 of the grommet 12 enters into the head portion-side engagement concave portion 44 of the pin 14, so that a fastening state of the grommet 12 relative to the attachment holes 34 and 36 is released. Consequently, the two-piece clip 10 is extracted from the attachment holes 34 and 36 so as to be capable of being removed.

(Return Procedure to Reusable State)

Next, a return procedure to a reusable state of the two-piece clip 10 of the present embodiment will be explained.

First, as shown in FIG. 1, the tip portion of the pin 14 of the two-piece clip 10 which is in the maximum push-in position is pushed back in the extracting direction (the arrow A direction in FIG. 1) relative to the grommet 12. At that time, only the inner end of the tip-side convex portion wall surface 54A of the engagement convex portion 54 of the grommet 12 abuts against the middle of the tip-side concave portion wall surface 44A of the head portion-side engagement concave portion 44 in the pin 14.

Consequently, the tip-side concave portion wall surface 44A of the head portion-side engagement concave portion 44 in the pin 14 slides against the inner end of the tip-side convex portion wall surface 54A of the engagement convex portion 54 of the grommet 12 so as to easily elastically deform each body-portion configuration piece 52 of the grommet 12 outward.

Namely, by the force pushing the tip portion of the pin 14 back in the extracting direction, the tip-side concave portion wall surface 44A of the head portion-side engagement concave portion 44 in the pin 14 slides against the inner end of the tip-side convex portion wall surface 54A of the engagement convex portion 54 of the grommet 12 so as to easily spread the engagement convex portion 54 of the grommet 12. As a result, the pin 14 moves in the extracting direction (the arrow A direction in FIG. 1) relative to the grommet 12, and through the standard position, the pin 14 is returned to the minimum push-in position (the reusable state).

(Operation and Effect)

As above, in the two-piece clip 10 of the present embodiment, as shown in FIG. 1, in the maximum push-in position, the inner end of the tip-side convex portion wall surface 54A of the engagement convex portion 54 of the grommet 12 abuts against the middle of the tip-side concave portion wall surface 44A of the head portion-side engagement concave portion 44 in the pin 14. Consequently, when the tip portion of the pin 14 is pushed back in the extracting direction (the arrow A direction in FIG. 1), the tip-side concave portion wall surface 44A of the head portion-side engagement concave portion 44 of the pin 14 slides against the inner end of the tip-side convex portion wall surface 54A of the engagement convex portion 54 of the grommet 12 so as to easily elastically deform each body-portion configuration piece 52 of the grommet 12 in the outer direction (the arrow B direction in FIG. 1). Namely, by the force pushing the tip portion of the pin 14 back in the extracting direction, the tip-side concave portion wall surface 44A of the head portion-side engagement concave portion 44 in the pin 14 slides against the inner end of the tip-side convex portion wall surface 54A of the engagement convex portion 54 of the grommet 12 so as to easily spread the engagement convex portion 54 of the grommet 12 in the outer direction. Consequently, by the simple operation of pushing the tip portion of the pin 14 back in the extracting direction, and by the operation capable of reducing the operational force, the pin 14 can be returned to the minimum push-in position (the reusable state) from the maximum push-in position shown in FIG. 1 relative to the grommet 12 through the standard position.

Also, in the two-piece clip 10 of the present embodiment, as shown in FIG. 3, the inner peripheral portion 22A of the body portion 22 of the grommet 12 and the outer peripheral portion 26A of the axis portion 26 of the pin 14 contact with each other on the surface extending in the direction along the axis line 14A of the pin 14. Consequently, the inner peripheral portion 22A of the body portion 22 of the grommet 12 and the outer peripheral portion 26A of the axis portion 26 of the pin 14 are closely attached on the surface extending in the direction along the axis line 14A of the pin 14, and the contact area of the inner peripheral portion 22A of the body portion 22 of the grommet 12 relative to the outer peripheral portion 26A of the axis portion 26 of the pin 14 increases. As a result, in the state wherein the members 30 and 32 are fastened together by the two-piece clip 10 so as not to be separated, the pin 14 becomes hard to be extracted relative to the grommet 12 so as to improve the removal resistance force.

Also, in the two-piece clip 10 of the present embodiment, as shown in FIG. 1, the inclination angle α1 relative to the axis line 14A of the pin 14 of the head portion-side concave portion wall surface 44C of the head portion-side engagement concave portion 44 formed in the pin 14 has the wide angle (α1>α2) compared to the inclination angle α2 relative to the axis line 14A of the pin 14 of the tip-side concave portion wall surface 44A of the head portion-side engagement concave portion 44 formed in the pin 14. Consequently, a closely attached portion of the inner peripheral portion 22A of the body portion 22 of the grommet 12 relative to the outer peripheral portion 26A of the axis portion 26 of the pin 14 can be extended long toward the tip side of the pin 14. Also, the contact area of the inner peripheral portion 22A of the body portion 22 of the grommet 12 relative to the outer peripheral portion 26A of the axis portion 26 of the pin 14 can be increased. As a result, in the state wherein the members 30 and 32 are fastened together so as not to be separated, the pin 14 becomes hard to be extracted relative to the grommet 12 so as to improve the removal resistance.

Also, the inclination angle α2 relative to the axis line 14A of the pin 14 of the tip-side concave portion wall surface 44A of the head portion-side engagement concave portion 44 formed in the pin 14 has the narrow angle (α2<α3) compared to the inclination angle α3 relative to the axis line 14A of the pin 14 of the tip-side convex portion wall surface 54A of the engagement convex portion 54 formed in the grommet 12. Consequently, the gap 60 can be formed between the pin 14 and the grommet 12, and the contact portion of the pin 14 relative to the grommet 12 is reduced, so that the force applied to the tip of the pin 14 concentrates on the contact portion of the pin 14 relative to the grommet 12 so as to be easily transmitted to the grommet side. As a result, the operational force when the pin 14 is returned to the reusable position relative to the grommet 12 can be reduced so as to further improve a workability.

Also, in the two-piece clip 10 of the present embodiment, in the inner end of the engagement convex portion 54 of the grommet 12, there is formed the top-portion projection 54C having the curved shape (the rounded shape). Consequently, in the maximum push-in position, the tip portion of the pin 14 is pushed back in the extracting direction (the arrow A direction in FIG. 1), and the body portion 22 of the grommet 12 elastically deforms outward. When the tip-side concave portion wall surface 44A of the head portion-side engagement concave portion 44 of the pin 14 slides against the top-portion projection 54C of the inner end of the engagement convex portion 54 of the grommet 12, the pin 14 can easily slide against the grommet 12. As a result, the operational force when the pin 14 is returned to the reusable position relative to the grommet 12 can be reduced so as to further improve the workability when the pin 14 is returned to the reusable position relative to the grommet 12.

Other Embodiments

In the above, a specific embodiment of the present invention has been explained in detail. However, the present invention is not limited to the aforementioned embodiment, and it is obvious for a person skilled in the art that other various embodiments can be carried out within the scope of the present invention. For example, in the aforementioned embodiment, although the two-piece clip 10 is made of synthetic resin, a material of the two-piece clip 10 is not limited to the synthetic resin. Also, the material of the grommet 12 and the material of the pin 14 may be a different material. Moreover, in the two-piece clip 10 of the aforementioned embodiment, three or more members may be fastened together.

What is claimed is:

1. A two-piece clip assembly, comprising:
a grommet including a body portion adapted to be inserted into attachment holes of overlapped members and split through at least two slits extending from a tip portion of the body portion to a base portion thereof, the body portion having an engagement convex portion formed at the tip portion and including a tip-side convex portion wall surface inclining inwardly upwardly in a direction from the tip portion of the body portion toward the base portion thereof and a base portion-side convex portion wall surface inclining outwardly upwardly from the tip-side convex portion wall surface, and a base part formed at the base portion of the body portion and adapted to abut against a peripheral edge portion of the attachment holes of the members, the base part having an insertion hole;
a pin including an axis portion inserted into the insertion hole of the body portion of the grommet, and a head portion provided in one end portion of the axis portion, the axis portion having a tip-side engagement concave portion engaging with the engagement convex portion of the grommet in a standard position where the pin is inserted into the insertion hole of the grommet to elastically deform the body portion of the grommet outward so as to clamp the members through the body portion and the base portion, and a head portion-side engagement concave portion formed between the tip-side engagement concave portion and the head portion, and engaging with the engagement convex portion of the body portion in a maximum push-in position where the pin is inserted into the insertion hole of the grommet further than the standard position, to elastically return the body portion of the grommet inward so as to pass through the attachment holes, the head portion-side engagement concave portion including a tip-side concave portion wall surface inclining inwardly upwardly in a direction from another end portion of the axis portion toward the one end portion thereof, and a head portion-side concave portion wall surface inclining outwardly upwardly from the tip-side concave portion wall surface,
wherein in the maximum push-in position, an inner end of the tip-side convex portion wall surface of the engagement convex portion abuts against a middle of the tip-side concave portion wall surface of the head portion-side engagement concave portion, and the tip-side concave portion wall surface of the head portion-side engagement concave portion of the pin has an inclination angle relative to an axis line of the pin narrower than an inclination angle of the tip-side convex portion wall surface of the engagement convex portion of the grommet relative to the axis line of the pin to form a gap between the pin and the grommet in the maximum push-in position.

2. A two-piece clip assembly according to claim 1, wherein an inner peripheral portion of the body portion of the grommet and an outer peripheral portion of the axis portion of the pin mutually contact on a surface extending in a direction along the axis line of the pin.

3. A two-piece clip assembly according to claim 1, wherein the head portion-side concave portion wall surface of the head portion-side engagement concave portion of the pin has an inclination angle relative to the axis line of the pin wider than the inclination angle of the tip-side concave portion wall surface of the head portion-side engagement concave portion of the pin relative to the axis line of the pin to increase a contact portion wherein an inner peripheral portion of the body portion and an outer peripheral portion of the axis portion contact each other.

4. A two-piece clip assembly according to claim 1, wherein the engagement convex portion of the grommet includes a convex portion having a curved shape at an inner end thereof.

5. A two-piece clip assembly according to claim 1, wherein the base part of the grommet includes a concave portion with a bottom portion concaved from a top portion thereof and housing the head portion of the pin, and the concave portion of the grommet has a depth larger than a thickness of the head portion of the pin; and an upper surface portion of the head portion of the pin is positioned at a height same as the top portion of the base part of the grommet in the standard position, and a lower surface portion of the head portion of the pin contacts the bottom of the concave portion of the base part of the grommet in the maximum push-in position.

6. A two-piece clip assembly according to claim 1, wherein the base part of the grommet includes guide concave portions formed at an edge portion of the insertion hole and climbing-over portions formed at respective ends thereof, and the axis portion of the pin includes first projections formed at the another end portion thereof and second projections formed at the respective ends thereof, the first and second projections being inserted in the guide concave portions; and the first projections pass through the climbing-over portions and are positioned inside an inner peripheral portion of the body portion of the grommet in a minimum push-in position where the tip-side engagement concave portion and the head portion-side engagement concave portion of the body portion of the grommet and the engagement convex portion of the axis portion of the pin are not engaged, to prevent the pin from extracting from the grommet, and the second projections pass through the climbing-over portions and are positioned inside the inner peripheral portion of the body portion of the grommet between the standard position and the maximum push-in position, to prevent the pin from extracting from the grommet.

* * * * *